United States Patent
Hendrix

(10) Patent No.: US 9,878,265 B2
(45) Date of Patent: Jan. 30, 2018

(54) SYSTEM FOR PRODUCING FRESH WATER AND ELECTRICITY USING COLD OCEAN WATER IN COMBINATION WITH WIND POWER

(71) Applicant: Glen Truett Hendrix, Houston, TX (US)

(72) Inventor: Glen Truett Hendrix, Houston, TX (US)

( * ) Notice: Subject to any disclaimer, the term of this patent is extended or adjusted under 35 U.S.C. 154(b) by 324 days.

(21) Appl. No.: 14/545,768

(22) Filed: Jun. 16, 2015

(65) Prior Publication Data

US 2016/0369646 A1    Dec. 22, 2016

(51) Int. Cl.
| | | |
|---|---|---|
| *B01D 3/00* | (2006.01) | |
| *B01D 5/00* | (2006.01) | |
| *F03D 3/04* | (2006.01) | |
| *F03D 9/25* | (2016.01) | |

(52) U.S. Cl.
CPC .......... *B01D 5/0084* (2013.01); *B01D 5/0012* (2013.01); *B01D 5/0054* (2013.01); *B01D 5/0057* (2013.01); *F03D 3/0427* (2013.01); *F03D 9/25* (2016.05); *F05B 2220/62* (2013.01); *Y02E 10/74* (2013.01); *Y02P 70/34* (2015.11)

(58) Field of Classification Search
USPC .......... 159/32; 60/641.7; 202/185.1
See application file for complete search history.

(56) References Cited

U.S. PATENT DOCUMENTS

| | | | | |
|---|---|---|---|---|
| 5,685,147 | A * | 11/1997 | Brassea | F03B 17/02 60/495 |
| 9,032,732 | B1 * | 5/2015 | Cowden | F03G 7/05 60/641.1 |
| 9,086,057 | B2 * | 7/2015 | Rekret | F03G 7/05 |
| 2008/0314043 | A1 * | 12/2008 | Howard | F01K 25/106 60/641.7 |
| 2009/0077969 | A1 * | 3/2009 | Prueitt | B01B 1/005 60/641.7 |
| 2010/0139271 | A1 * | 6/2010 | Howard | F03G 7/05 60/641.7 |
| 2011/0061383 | A1 * | 3/2011 | McAlister | F03G 6/00 60/641.7 |

* cited by examiner

*Primary Examiner* — Nina Bhat

(57) ABSTRACT

A system for producing potable water and electrical power utilizing the difference in temperature between ambient air and deep, cold ocean water is disclosed. Cold water from depths of 2000 feet (610 meters) or more is pumped to a liquid/gas heat exchanger in the upper portion of a hollow cylinder. Ambient air currents are concentrated and diverted into the exchanger, becoming cooler and denser. Moisture condensing from the ambient air onto the cool surface of the heat exchanger is collected and channeled to storage or piped to shore. The air gains velocity before reaching a wind turbine near the bottom of the cylinder. This turbine is connected to a generator to extract the wind energy. This extracted energy is converted to electricity by the generator and sent to shore.

8 Claims, 8 Drawing Sheets

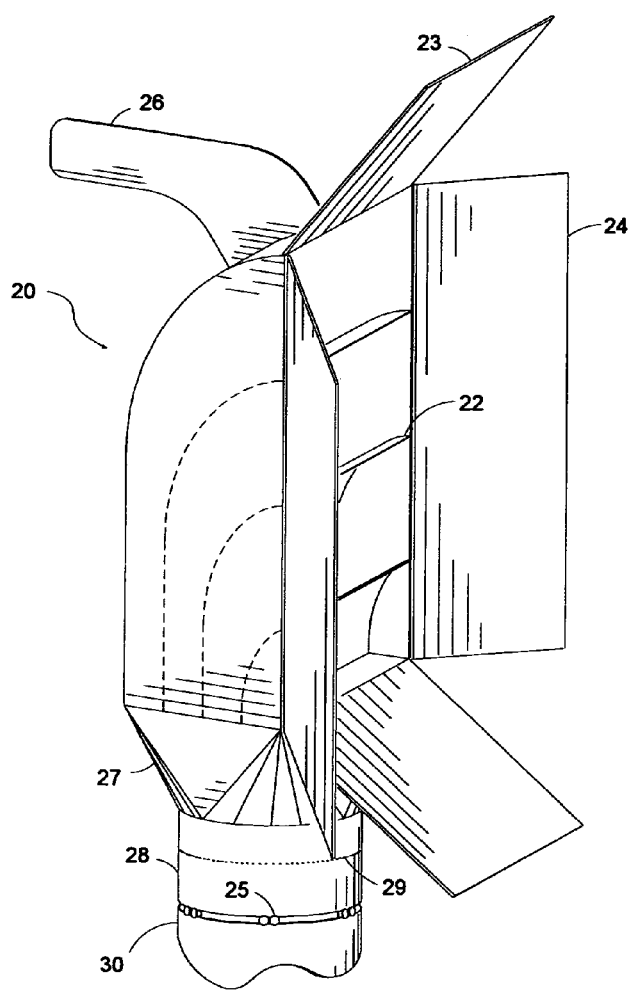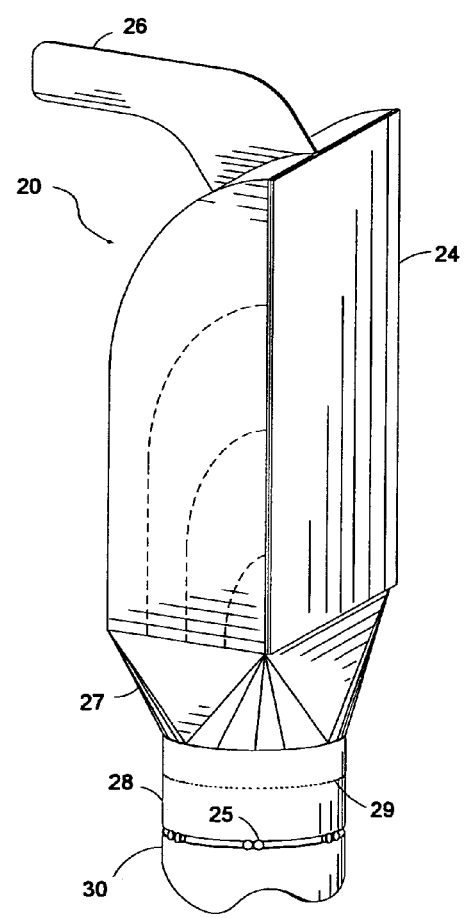
FIG. 2a
FIG. 2b

SYSTEM FOR PRODUCING FRESH WATER AND ELECTRICITY USING COLD OCEAN WATER IN COMBINATION WITH WIND POWER

CROSS REFERENCES TO RELATED APPLICATIONS

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT INVOLVING PRIOR DISCLOSURES BY THE INVENTOR OR A JOINT INVENTOR

Not Applicable

BACKGROUND OF THE INVENTION

Field of the Invention

When we speak of alternative energy, we are often talking about huge wind turbines; a conventional alternative energy. The present invention relates to an alternative to conventional fossil fuel and nuclear as well as an alternative to what is viewed as one of the conventional alternative means of producing power—a typical wind turbine. The invention will produce fresh water and electricity from the combination of ambient wind and the temperature difference between ambient air and deep ocean water.

One of the largest storehouses of energy lies quietly at the bottom of the ocean. It is not oil, and it is not methane hydrate. It is cold water. Specifically, it is deep ocean water from the upper levels of the Midnight Zone at 3,300 to 13,200 feet deep (1000 to 4000 meters). Approximately 90% of the ocean by volume is deep ocean water. This water is at a temperature of 32° to 37° F. (0° to 3° C.). More correctly, it might be called a storehouse of a relative lack of energy because it is only the combination with a more energetic (warmer) mass that results in an extractable form of energy. That more energetic mass would, of course, be the warm upper regions of the Twilight Zone and the Sunlight Zone of the ocean and the tropospheric layer of the atmosphere.

Although this is the coldest water, anything 2,500 feet (762 meters) and deeper in the ocean is about 46° F. (8° C.), which is usable for applications involving the herein described invention. More than 90% of the oceans are greater than 2,500 feet (762 meters). I will hereafter refer to this as cold ocean water to differentiate it from the established term deep ocean water, or DOW.

The best place to exploit this temperature differential is the Tropics where the temperatures near and above the surface of the water are mild to hot year around. Fortunately, approximately 40% of the world's surface lies in the Tropics and it includes a lot of DOW and cold ocean water. While a tropical climate is the most efficient location for extracting water and power, an appreciable percentage of the North and South temperate zones have sufficiently warm weather to make this practical. For the United States that would include the coastline and offshore of states along the Gulf of Mexico, the eastern coast of Florida and the southern coast of California.

Fossil fuel has dual liabilities. First, it is a finite resource with increasingly high production costs and, secondly, contributes to a rising build-up of $CO_2$ in the atmosphere. Nuclear has another set of problems involving long-term waste storage and hard-to-calculate catastrophe risks. At our current level of civilization, deep ocean water represents a relatively infinite supply of energy that can be exploited without adding greenhouse gasses or waste heat or radiation to the atmosphere.

Notwithstanding all the talk of peak oil, an even more pressing issue for the future growth of mankind is water. Peak water may have already occurred. The major constriction for increasing food supply for a burgeoning population is water, not land. According to the International Food Policy Research Institute, nearly 5 billion people, about half of global grain production, and 45% of the GPD ($63 trillion dollars) will be at risk due to lack of water with current consumption practices. Eighteen countries are now over-pumping their aquifers. This includes the big-three grain producers—China, India and the U.S.—and several populous countries such as Iran, Pakistan and Mexico. For 20 years Saudi Arabia was self-sufficient in growing wheat. They have nearly exhausted their aquifers and will quit growing wheat in the year 2016. Water shortages in California and Brazil are affecting the lives of millions of people and could affect food prices worldwide if drought conditions continue through 2015 and beyond.

We have energy alternatives to oil, but there are, as yet, no viable equivalent alternatives for water. As a byproduct of producing electricity, deep ocean water and cold ocean water can be used to supply a large amount of fresh water to a world more and more in need of it.

Description of the Related Art

The following is a tabulation of some prior art that presently appears relevant.

| U.S. Patents | | | |
|---|---|---|---|
| Pat. No. | Kind Code | Issue Date | Patentee |
| 7,748,946 | B2 | Jul. 6, 2010 | Rongbo Wan |
| 8,117,843 | B2 | Feb. 21, 2012 | Robert James Howard, et al |
| 20140138236 | A1 | May 22, 2014 | Keith White |
| 8,277,614 | B2 | Oct. 2, 2012 | Majed Mohal Alhazmy |

Conventional wind turbines are large; 130 to 300 feet (40 to 91 meters) in diameter. They are a prominent arrangement of blades, generator and gearbox sitting atop a relatively thin tower. A 2-megawatt Gamesa G87 weighs 334 tons US (303 tons metric). The nacelle alone weighs 72 tons US (65 tons metric). The blades are 42 tons US (38 metric tons) and the tower is 220 tons US (200 tons metric). The base adds another 1000 tons US (907 tons metric) of steel and concrete. It needs a footprint of over 100 acres (405,000 square meters). Transportation of the parts require extensive infrastructure. Roads have to be strong, wide and straight. The power they generate fluctuates with the wind and adds to the complexity of keeping a steady amount of power fed to the electrical grid. Base power plants running on fossil fuels are reduced in efficiency when required to ramp up and down with the vagaries of the wind. They can be seen for miles in all directions. The sound that wind turbines produces has been linked to migraine-like symptoms in humans living nearby as well as panic attacks, insomnia, tachycardia, and tinnitus. The flickering shadow the blades cast during the day has now been tied to depression. They kill an estimated 900,000 bats and 600,000 birds a year (2012) in the U.S. alone. There are many patents concerning wind turbines, with quite a few in public domain. Much of the current intellectual property concerning wind turbines deals with problems surrounding their operation. An example of this is U.S. Pat. No. 7,748,946 (2010), Rongbo Wan, dealing with the overheating of rotating parts in the nacelle.

Ocean thermal energy conversion, OTEC, uses closed or open type systems and low-pressure turbines to exploit the temperature gradient. Basically, the temperature differential is used to alternately vaporize fluids, run the vapor through a turbine and condense the vapor back into a liquid. These fluids have to have a low temperature of vaporization. These are complex mechanical systems with many components that add to the possibility of leakage of working fluids such as ammonia or refrigerant fluids into the environment. One such patent is U.S. Pat. No. 8,117,843 (2012), Robert James Howard et al, which involves the establishment of a cold thermal mass at deep ocean water depths and raising it up to be coupled to a warm water mass at the surface. This mass could be clathrates or ammonia, either of which could harm the environment if allowed to leak into the atmosphere.

An atmospheric water generator, AWG, extracts water from humid ambient air. Typically compressors and fans are used, making the extraction of water from the air a process that can be energy intensive. U.S. patent 20140138236 (2014), Keith White, describes an atmospheric water generator that could also produce electricity while harvesting water from a heat exchanger coil, but it involves environmentally challenging refrigerants and uses conventional means to cool the refrigerant back down. That would mean either a source of cold water or a conventional refrigeration unit.

Desalination plants typically use 15,000 kilowatt hours per one million gallons of fresh water produced. The water ends up costing about $2.5-4 dollars per 1,000 gallons (3800 L) depending on the price of electricity. U.S. Pat. No. 8,277,614 (2012), Majed Moalla Alhazmy, describes a plant that uses multiple flash chambers and counter-flow of heating and cooling mediums to increase the efficiency; however, the energy required to heat water to the point that it or a portion of it will become vapor requires some externally applied heat. Energy is also needed for pumps to move the heated and cooling liquid through flash chambers and heat exchangers.

SUMMARY OF THE INVENTION

A current embodiment provides a system for producing power and fresh water utilizing the temperature difference between DOW or cold ocean water and ambient atmosphere. Ambient wind currents are diverted and concentrated from a horizontal to vertical direction by a scoop with turning vanes that self-aligns with the wind and rotates 360 degrees. This warm, humid air enters a liquid-to-gas heat exchanger. DOW is pumped through the liquid handling part of the exchanger. The warm air and cold water exchange heat. As the air cools moisture in the air condenses and is diverted out of the heat exchanger into a separate fresh water collection and storage system. This cooler air is denser and accelerates down a vertical shaft. The initial velocity of the air exiting the heat exchanger is augmented by the reverse stack effect; just as heat rises through a chimney, cold air will fall. The air gathers momentum before entering a horizontally mounted wind turbine and then exits the base of the vertical shaft through aerodynamically designed ports about the base of the shaft. The wind turbine is connected to a generator and converts the wind energy into electricity. A portion of this electricity is used to power the pumps that pump DOW or cold ocean water up to the heat exchanger.

In one embodiment, a spar-type floating cylinder is anchored offshore in an area of the ocean that is deep enough to have water significantly cooler than surface water or air and is as close to land as possible to facilitate the transfer of electricity and water to shore. The cylinder is anchored to the seabed so that its upper portion containing the heat exchanger and wind turbine is above the surface of the sea and a water storage portion acting as ballast extends below the water's surface. A pipe extends to the depths of the ocean and provides a conduit for pumping cold water to a heat exchanger in the top portion of the cylinder. The liquid-to-air heat exchanger cools the air at the top of the cylinder, causing it to become denser and fall through the cylinder producing a flow of air. The taller the cylinder and cooler the air, the faster the air flows.

Assisting this flow is a collection hood pivotally mounted to the top of the cylinder. With the assistance of a wind vane, it automatically turns into the wind to collect as much as possible. The inlet of the collection hood is larger than the outlet and it contains turning vanes to assist with the airflow. Also, doors on the inlet of the scoop will be positioned to assist in the collection of air, throttle the air, or close it off altogether during heavy storms. This flow of air passes through the heat exchanger, the wind turbine and is then ducted to the outside to keep the flow of ambient air going. The wind turbine turns a generator and this electricity, along with the water condensate, is transported to shore via cables and pipes. It would be more efficient to have several of these units grouped together and have their combined outputs transported over one big pipe and cable.

The embodiment of the system described above, 120 feet (37 meters) in diameter and minimum 500 feet (152 meters) in length including water storage beneath the surface of the ocean, would produce an average of 20.4 megawatts and six million gallons (22,700,000 liters) of water per day. It is simpler in construction than an offshore drilling or production rig or even a cruise ship. Current cruise ship fabricated cost is about $2.60 per pound (0.454 kg). Estimated cost for the system would be less; about $2 per pound. Estimated weight of the embodiment with the capacities mentioned above is about 3,000 tons US (2722 metric tons). While that is more than a conventional wind turbine, the $67/MW installation cost is comparable to the lower upper range of a conventional wind turbine. But this discounts the value of the water produced, which is an additional 30% over power alone. That assumes a 20% efficiency in removing water vapor from ambient air. Some embodiments detail a way to increase this. While undersea cable and pipe costs may run about $1 million dollars per mile (1.6 km) that cost can be mitigated by multiple units using a common carrier pipe and cable to deliver power and water to shore. Some embodiments do not require the additional cost of a pipeline to shore because they are self-contained or lighter their produced water to ships. Also, there is no cost to buy or rent land in this and other embodiments. This fact alone can reduce costs by a substantial percentage.

In another embodiment, the offshore water production is transported by pipe to an onshore reservoir from which it is distributed to the end consumer. This reservoir or a portion of it is elevated so that it can be used to store up energy from the offshore unit in the form of hydroelectric power. This would also help mediate the electricity produced by the offshore unit. As the wind turbine offshore fluctuates in the production of electricity, an onshore water turbine ramps up and down to make up for it, evening out the quantity of electricity produced.

Another embodiment has the heat exchanger and wind turbine housed in a cylindrical tower erected on shore where DOW or cold ocean water is pumped directly to the system with the warmer effluent returning to the ocean from the base of the tower. The condensate water from the heat exchanger is dumped directly into an adjacent reservoir from which the water is distributed. Efficiency would be improved by having several or more of these units spaced far enough apart to efficiently catch ambient wind but close enough together to take economic advantage of a single pipe and pump system supplying such a wind farm with cold ocean water.

Another aspect of this embodiment is the availability of chilled water (both fresh and seawater) to use in nearby buildings or other installations as a source of air conditioning or to assist in refrigeration of food on a warehouse scale.

In yet another embodiment, the central spar cylinder is but a portion of a system consisting of several connected spars supporting decks upon which housing or industrial facilities may be installed. The roofs of such facilities would support leisure activities or gardens or both. This embodiment allows an integral means of locomotion so that it may be moved about without being towed. It also allows space for further extraction of atmospheric water via secondary heat exchangers at the wind turbine outlets.

Penstocks for raising fish can be installed beneath this embodiment. With DOW being nutrient dense, a portion of it is diverted after going through the heat exchanger to the near surface where it benefits aquaculture for the raising of salmon, shrimp, clams, mussels, abalone, scallops, oysters, and micro-algae such as spirulina used in health food supplements.

Producing its own power, water, and food; such a system would be dependent only on industrial goods, some food, and medicine for which it could trade power, water, and seafood. This embodiment could be used as a base for ocean exploration, recycling floating ocean plastic, or ocean floor mining. This embodiment could also be used as an offshore server farm using the cooled air to keep the machines from getting too hot.

In yet another embodiment, the system or several systems are installed into an appropriate hull to form a seagoing cargo vessel. These would produce electricity powering an electric motor, propelling the ship. This vessel could tow a barge that stores water since water is the major byproduct of power production when using this system. It could also store hydrogen produced using any excess electrical energy to perform hydrolysis on seawater or fresh water. In addition to cargo hauled by the ship, the water and hydrogen can be offloaded and sold at ports of destination.

Advantages

Several advantages of one or more aspects of the system should become apparent.

a. One aspect of the system is the sound of the turbine is mitigated by the outer casing.

b. Bird and bat deaths are eliminated.

c. There are no chemicals to leak into the environment.

d. It produces free water rather than the relatively expensive water a typical desalination unit produces.

e. It is more consumer-friendly by taking the sights and sounds of energy and water production offshore.

f. It can produce power even when the wind is not blowing, providing up to 14 mph (6.3 mps) of downdraft most of the time due to the reverse stack effect, g. The seawater in contact with inner, hard-to-clean surfaces of the device is too cold and salty to form algae, minimizing maintenance.

h. There is no need for directional adjustment of the turbine, eliminating azimuth yaw mechanisms needed to align the blades perpendicular to the wing, thus eliminating weight and expense.

i. It is cheaper than a conventional wind turbine when considering the water production.

j. Portions of it being located at sea eliminate cost of rental or purchase of property, lessening or eliminating the social and economic concerns of a large footprint.

k. Infrastructure requirements of land transportation are eliminated.

l. There is very little peripheral loss of wind taking the path of least resistance around the turbine blade.

m. Many components are off-the-shelf technology or easily modified.

n. It is non-polluting.

o. There is an abundance of operating medium—Deep Ocean Water.

p. No special materials are required.

q. It extracts more energy per square foot of turbine surface than a conventional turbine.

r. It produces energy and fresh water simultaneously with no more expenditure other than capital and maintenance costs.

s. The horizontal plane of the turbine allows more efficient, longer lasting bearings to be used.

t. The cool, nutrient-dense deep ocean water can be used near the surface for aquaculture.

u. Flickering shadows cast on the surrounding landscape are eliminated.

v. Allows for the use of a smaller, higher speed wind turbine, reducing the cost of a gearbox.

w. Creates the possibility of relatively self-contained, ocean-going islands with their own power, water, and food supply.

x. Could be used to cool surface water of the ocean near major coastal cities to ameliorate the strengthening of approaching tropical storms or hurricanes.

y. It maintains a cool environment for rotating, heat generating, parts of the wind turbine, no matter the external environment.

These and other advantages of one or more aspects of the system will become apparent from a consideration of the ensuing description and accompanying drawings.

A BRIEF DESCRIPTION OF SEVERAL VIEWS OF THE DRAWINGS

FIGS. 2a and 2b are isometric views of the wind diverter at the top of the system when open and closed.

Figure 1:
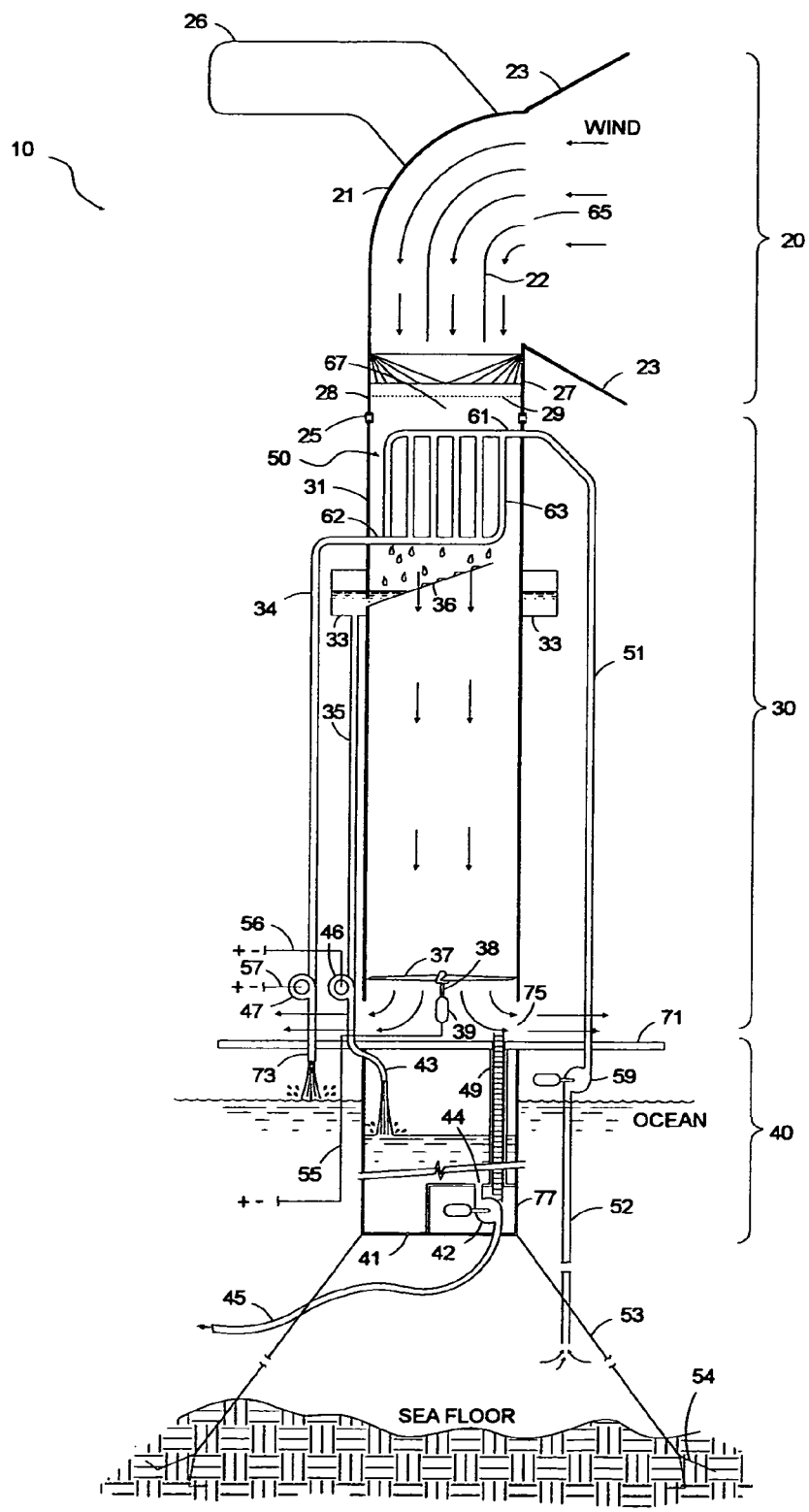
FIG. 1 shows a diagrammatic elevation of the system as an offshore installation.

DRAWINGS—REFERENCE NUMERALS 10 system for producing power and water anchored offshore
20 wind diverter
21 rectangular elbow
22 turning vanes
23 horizontal doors
24 vertical doors
25 bearings
26 automatic directional vane
27 rectangular to round transition
28 bottom cylindrical portion of wind diverter
29 bird screen
30 vertical wind channel
31 cylindrical casing plate
33 fresh water collection tank
34 deep ocean water return piping
35 fresh water collection drain
36 guttering/channels for collecting water
37 wind turbine blade
38 wind turbine blade shaft
39 gearbox/generator
40 fresh water storage tank
41 fresh water storage tank bottom
42 fresh water outlet pump
43 fresh water storage tank inlet
44 fresh water tank outlet
45 fresh water storage-to-shore piping
46 fresh water energy reclamation turbine/generator
47 seawater energy reclamation turbine/generator
48 diverter stub column
49 ladder well and ladder
50 gas to liquid heat exchanger
51 heat exchanger inlet piping between DOW inlet pump and exchanger
52 deep ocean water suction piping
53 sea anchor cables
54 seabed anchor
55 electrical conductor cables from wind turbine generator
56 electrical conductor cables from fresh water energy reclamation turbine/generator
57 electrical conductor cables from seawater energy reclamation turbine/generator
58 interconnecting cable and pipe
59 deep ocean water inlet pump
61 upper liquid inlet header for gas-to-liquid heat exchanger
62 lower liquid outlet header for gas-to-liquid heat exchanger
63 multiple passes of the gas-to-liquid heat exchanger
65 horizontal inlet of the wind diverter
67 vertical outlet of the wind diverter
71 service deck
73 seawater turbine outlet piping
75 wind outlets
77 fresh water pump access chamber
80 simpler wind diverter
90 underwater living levels
100 system for producing water and power onshore
111 onshore water reservoir containment wall
113 sluice or channel feeding stored-water turbine/generator
115 stored-water turbine/generator
117 cables for conducting electricity from the stored-water

DETAILED DESCRIPTION OF THE INVENTION

FIG. 1 shows a diagrammatic elevation of the system 10. A wind diverter 20 sits on top of the vertical, cylindrical wind channel 30. The wind channel 30, in turn, rests on top of, and is directly connected to, the fresh water storage tank 40 extending below the surface of the ocean.

Description of Wind Diverter 20 for System 10

With continued reference to FIG. 1, the wind diverter 20 consists of a hollow, curved elbow 21. An automatic directional vane 26 is attached to the top rear of elbow 21. Horizontal doors 23 and vertical doors 24 attach to the horizontal inlet 65. Air turning vanes 22 are attached to the inside of elbow 21 and extend from the horizontal inlet 65 to the top of a square to round transition 27. The bottom, round portion of the transition 27 attaches to a short length of cylinder 28. Installed in this cylinder 28 is a bird screen 29 that covers the entirety of the inside of cylinder 28. This cylinder 28 rests on and is captured by bearings 25.

Operation of Wind Diverter 20 for System 10

Speaking with reference to FIG. 1, the curved elbow 21 performs the essential task of diverting wind from the horizontal to the vertical plane. The directional vane 26 operates much like a weather vane by automatically pointing the inlet 65 of the elbow 21 into the wind. The vane 26 attaches at the top rear of the elbow 21 and is large enough and extends far enough to provide the torque necessary from ambient breeze to turn the wind diverter 20.

The horizontal doors 23 and the vertical doors 24 open up to an optimal angle to concentrate air into the elbow 21 without losing efficiency to turbulence and frictional forces. To facilitate this task the doors are as large as practical. The vertical doors 24 are as wide as the inlet 65. One door will overlap the other when the doors are closed to protect the system from high wind. The horizontal doors are half the vertical dimension of the inlet 65. This allows them to close without overlapping and be a sufficient length for the outer edges to line up with the outer edges of the vertical doors 24 when both sets of doors are optimally positioned to gather and concentrate wind into the wind diverter 20. The doors will be hydraulically or pneumatically activated and can be used to throttle wind by partial closing should wind velocity become too high for safe and proper operation of the system 10. Operation of the doors can be automatically controlled by wind sensing and satellite weather data or manually controlled by a human maintenance/operator.

Turning vanes 22 stabilize the wind as it enters the wind diverter 20 and makes it more laminar as it exits. The turning vanes 22 are curved sheets of material attached to the inside of the curved elbow 21. They divide the area of the inlet 65 into separate horizontal equal areas. Their geometry is such that they smoothly transition these inlet areas to smaller but equal areas at the wind diverter outlet 67. Turning vanes are commonly used in commercial ducting elbows to combat friction and turbulence.

Between the doors gathering wind and the inlet 65 being larger than the outlet 67 the ambient wind speed is increased before it flows out of the curved elbow 21 and into the rectangular to round transition 27. The transition 27 has an optimal apex angle to, once again, cut down on frictional forces and turbulence of the air. It transitions down to the same circular size as the upper opening in the vertical wind channel 30. A short stub column 28 is attached to the circular bottom of the transition 27. This cylindrical stub column 28 is the same size and shape as the vertical wind channel 30.

Bearings 25 are to be placed between the stub column 28 and the channel 30. These bearings 25 allow the wind diverter 20 to rotate 360 degrees in relation to the wind channel 30. The bearings 25 are so configured as to capture the wind diverter 20 and keep it from being blown off in a high wind. The bearings 25 will also be designed so as to provide reduced friction bearing surfaces for both downward and uplift loads coming from the wind diverter 20.

A bird screen 29 is installed in the stub cylinder does two things. Obviously it keeps birds, bats, and debris from entering the system. It also causes a pressure build-up on top of the screen 29 that evens out the flow from the vertical outlet 67 of the wind diverter 20 into the top of the wind channel 30.

Description of Vertical Wind Channel 30 for System 10

Continuing with reference to FIG. 1, the vertical wind channel 30 is housed by a cylindrical casing plate 31 that extends downward almost to sea level. A gas-to-liquid heat exchanger 50 is installed in the upper portion of the channel 30. An upper DOW inlet header 61 is continuously connected to a lower DOW outlet 62 by a number of parallel heat exchanger circuits 63. The inlet header is fed by the DOW inlet piping 51. The outlet header 62 feeds DOW to a downcomer pipe 34 and through a seawater energy reclamation turbine/generator 47 and turbine outlet piping 73.

Aligned with the bottom elements of the heat exchanger 50 are channels 36 for collecting condensate from the exchanger. This condensate is introduced into a fresh water collection tank 33 that serves as a temporary storage before it goes into a fresh water collection drain 35 that routes the fresh water through a fresh water energy reclamation turbine/generator 46.

At the bottom of the wind channel 30 is a wind turbine 37 vertically mounted with its axis aligned with the center of the channel 30. The turbine 37 is attached to a shaft 38 attached to a gearbox/generator 39. Below the turbine 37 are wind outlets 75 spaced symmetrically around the base of the vertical channel 30.

Operation of Vertical Wind Channel 30 for System 10

With reference to FIG. 1, as air leaves the wind diverter 20 it enters the top of the vertical wind channel 30 and the inlet of the gas-to-liquid heat exchanger 50. The gas-to-liquid heat exchanger 50 allows heat to flow from the ambient air to the cold seawater. The heat exchanger 50 is constructed to offer the least resistance to airflow while transferring as much heat as possible. Moisture in the air condenses out on the surfaces of the exchanger 50. Beads of moisture join to form rivulets and run down the fins and pipe to the bottom-most point and drip off. This moisture drips into channels or guttering 36 for collecting water. These channels 36 are designed to offer little air resistance while maximizing capacity for collecting water. Their open tops will be in exactly the right place and just wide enough to receive the dripping water. They will be slanted to direct the water into the fresh water collection tank 33. The gutters will be no wider than the small bore pipe but will get deeper as they approach the wall of the vertical air channel 30 to handle more water. Penetrations in the cylindrical casing plate 31 allow the water to enter a fresh water collection tank 33 attached to the outside of casing plate 31. From the collection tank 33 water goes into the fresh water collection drain 35. This drain conducts the fresh water through a fresh water energy reclamation turbine/generator 46 producing electricity to be conducted away from the turbine by conductive cables 56.

Cold ocean water is introduced into the heat exchanger 50 through the heat exchanger inlet piping 51 that extends between the DOW inlet pump 59 and the heat exchanger upper liquid inlet header 61. It travels multiple parallel passes 63 through the heat exchanger 50. Individual passes will consist of a vertical run of small bore piping so as not to block the air flow. In addition to small-bore piping, fins will be attached to the pipe. These fins will be axial to the pipe, forming vertical paths offering little wind resistance. The fins absorb heat from air passing over them and conduct it to the wall of the pipe where it is transferred to the cold seawater. As the air gets cooler in these channels it becomes denser and falls faster. Alternately, passes may consist of plate exchangers where the path for the liquid is formed in a plate and welded to another plate, usually flat. The sectional profile these plates present to the air path are only slightly wider than the channel allowing liquid to pass between the plates. The plate provides a similar heat transfer surface as the fins in the previously described pass involving pipes and fins. Likewise, air between these plate exchanger passes becomes cooler, denser, and falls faster as it travels downward through the heat exchanger 50. The cold seawater flows from the multiple passes 63 into the lower liquid outlet header 62 and into a DOW return piping 34 which routes the water through a seawater energy reclamation turbine/generator 47. This generator creates electricity conducted elsewhere by electrical cables 57. From the turbine/generator the cold seawater is allowed to mix with ocean surface water where it can enrich the water with nutrients and cool it for oxygen retention. This conditioned ocean surface water can then be used in various forms of aquaculture. Alternately, the used seawater can be piped back to the depths of the ocean.

Once through the heat exchanger 50, cooled air keeps accelerating until it reaches a horizontally mounted wind turbine 37 in the base of the wind channel 30. This wind turbine 37 fills most of the area of the channel at this point. The space between the tips of the turbine blade and the inside wall of the cylindrical casing plate 31 will be minimal to keep air from going around the blade tips and bypassing the turbine 37. The horizontal mounting of the turbine will allow bearings to be used that will be more efficient and last longer than those used in a typical vertically installed wind turbine. The blades of this turbine 37 will not have to endure the same stresses as blades of a vertical wind turbine. The constant loading and unloading of gravitational loads on the blades will be gone as well as intermittent and unbalanced wind loads from support tower interference. As a result, this turbine will be able to operate at the higher normal wind speeds system 10 will generate.

The turbine 37 is connected via a shaft 38 to a gearbox/generator 39. This generates electricity distributed to shore by conducting cables 55. The generator/gearbox will be housed in an aerodynamic shape to cause as little wind turbulence as possible. As it passes through the turbine, air will exit the vertical channel 30 through symmetrically spaced wind outlets 75 around the base of the channel 30.

Description of the Water Storage Tank 40 for System 10

Below and securely affixed to the vertical wind channel 30 is the water storage tank 40. Still speaking towards FIG. 1, a portion of this tank 40 is above sea level but much of it extends below the surface of the ocean to provide stability for the system 10 and storage space for fresh water produced by the system. It is cylindrical in shape and can be the same or a different diameter than the cylindrical casing plate 31 but is structurally integral with the casing plate 31. At the very top of the water storage tank 40 is the service deck 71. This deck provides a mounting and access area for the turbine 37 and generator 39 as well as the hydropower reclamation pumps 46, 47 and the DOW inlet pump 59. It forms the roof of the water storage tank 40. How far down the water storage tank 40 extends into the ocean is a function of what is needed to stabilize the system 10 and store fresh water. The bottom 41 is sealed from seawater intrusion by ordinary metal fabrication techniques.

At the bottom of the tank 40 is the fresh water outlet pump 42 that takes in water through the fresh water tank outlet 44. The pump 42 is situated inside the fresh water pump access chamber 77 and pumps the fresh water into a pipe 45 that takes the fresh water to shore. Ideally, this pipe 45 and the electrical conducting cables 55 would be efficiently combined to save space and installation costs.

Attached to the bottom of the storage tank are anchoring cables 53. These attach to seabed anchors 54. These anchor cables and anchors will be symmetric about the system 10 and sufficient in quantity to keep the system stable and anchored even during high wind and waves. This arrangement is typical for many spar-type offshore platforms. The buoyancy of the water storage tank 40 keeps a positive load on the anchor cables 53 and provides stability to the system 10.

Operation of the Water Storage Tank for System 10

With regards to FIG. 1, fresh water enters the fresh water storage tank 40 through the inlet pipe 43. When there is sufficient water in the tank, it is pumped to shore to be used for domestic use or for agriculture. Alternatively, it could be lightered to a tanker and shipped anywhere. There will be stairwells or ladder wells 49 to access various levels of the tank for maintenance and to access the fresh water outlet pump 42 at the bottom of the water storage tank. This pump 42 is shown located at the bottom of the water storage tank but may be located at the top of the tank or on the service deck 71. In addition to stair wells or ladder wells 49 there will be enough air-filled cavities due to structure, servicing, and maintenance requirements to give the water storage tank 40 enough buoyancy to support the service deck 71, vertical wind channel 30, and the wind diverter 20 and provide for a safe, stable system 10.

The pipe 45 taking water from the tank to shore will be placed on or under the ocean floor for security of the system. With the most toxic thing it will carry being distilled water (which could be deadly for some ocean creatures but would quickly dilute to an ambient salinity) the pipe may be suspended partially submerged at elevations safe from fishing nets. This is a less expensive way to install the piping 45 to shore.

FIGS. 2a and 2b show the rotating wind diverter 20 in more detail with FIG. 2a showing the doors 23 and 24 open for collecting wind and FIG. 2b showing the doors closed for protection against high wind. FIGS. 2a and 2b also show the distribution of several bearings 25 about the bottom periphery of the stub cylinder 28 to take the load of the wind diverter 20 and allow it to rotate.

Figure 3:
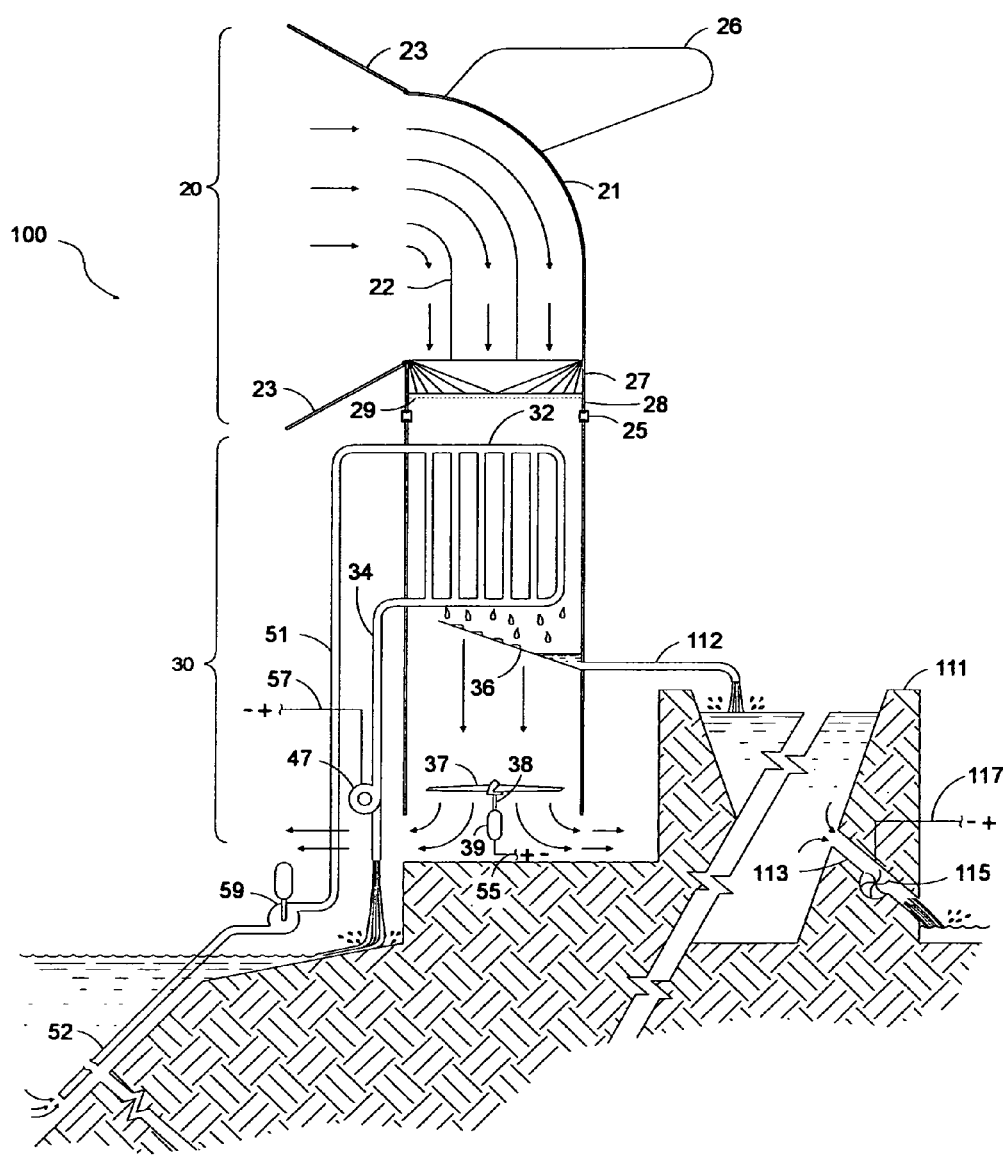
FIG. 3 shows a diagrammatic elevation of the system as an onshore installation.

FIG. 3 shows the system 100 as an onshore installation. Locating close to the shore line takes advantage of heightened wind activity typical of such a location and gives wider options for material and logistics in construction. This system 100 has a cold ocean water or DOW suction pipe 52 that extends from shore to the closest access to such cold water as to provide efficient functioning of the system 100. This system 100 functions much the same as system 10 in that the fresh water is collected by the same guttering/channels 36, but the water then feeds through a freshwater collection pipe 112 directly into a reservoir 111 that stores the water for further distribution inland. This reservoir 111 also builds up hydraulic energy to be tapped by a channel or sluice 113 that feeds the water through a turbine/generator 115. Conducting cables 117 carry this electricity to an appropriate device for combining it with electricity from the wind turbine generator 39 and the seawater energy reclamation turbine/generator 47 to produce uniform electrical power that is fed to the grid for distribution.

Figure 4:
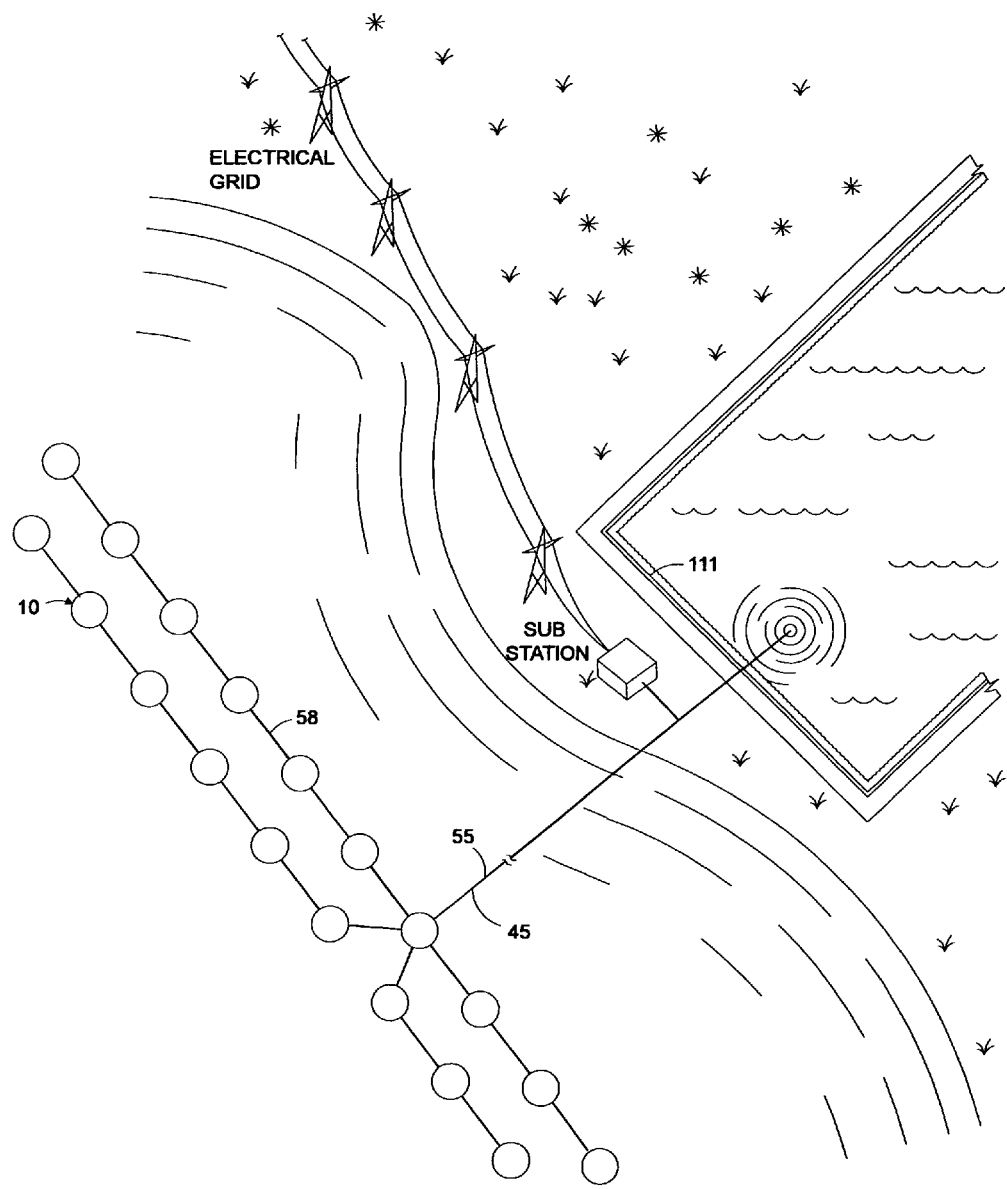
FIG. 4 is a schematic showing a multiple unit system and distribution scheme.

FIG. 4 is a diagrammatic plan view of a system 10 being deployed in multiple locations offshore. The water is pumped from each individual system's storage to the next until it is received by a system 10 directly connected to a reservoir 111 onshore. Electrical energy is gathered in a similar manner to be conveyed to the onshore electrical grid.

Figure 5:
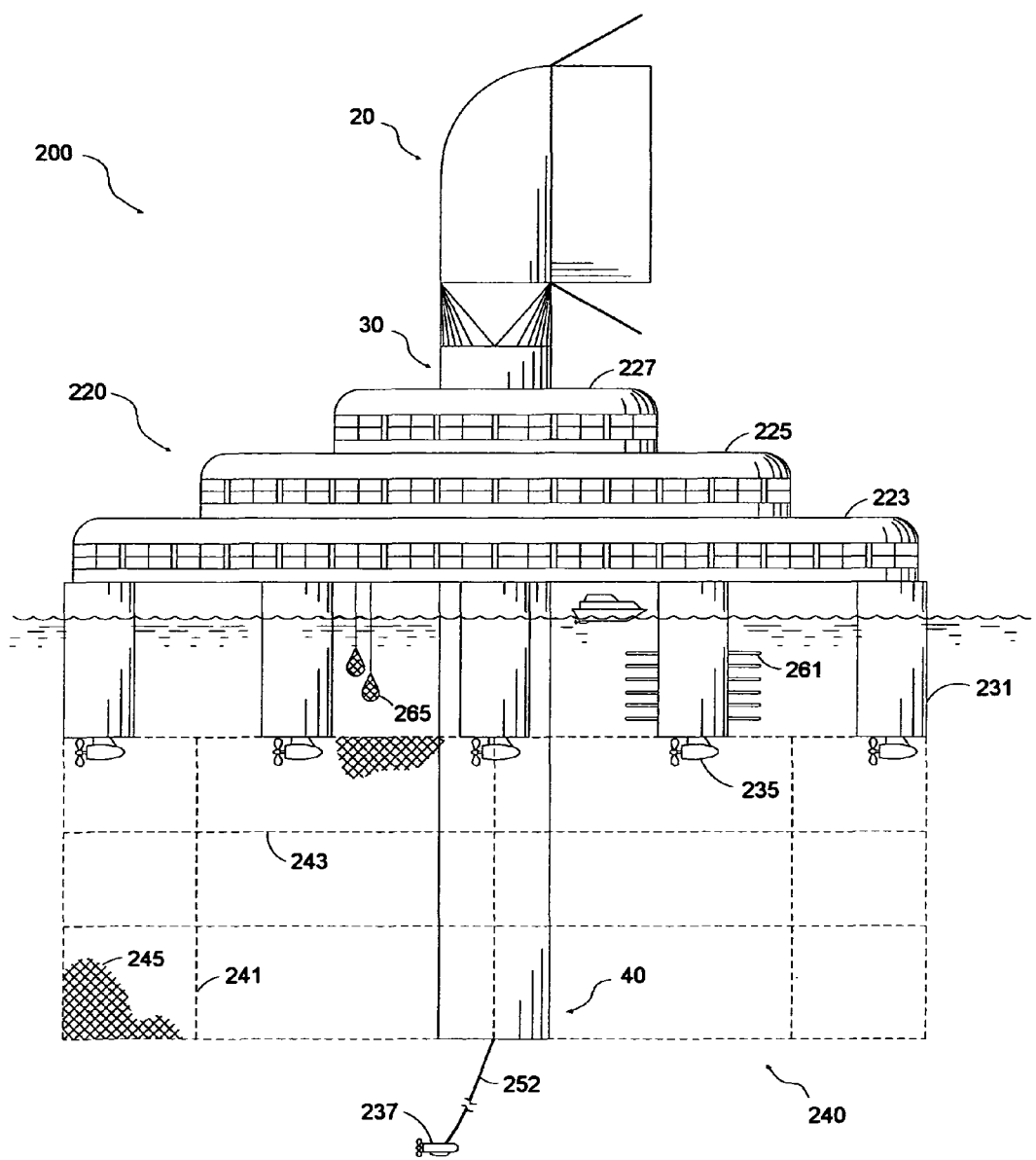
FIG. 5 shows a free-floating, self-contained system.

FIG. 5 shows an independent, ocean-going system 200 where additional infrastructure 220 in the form of several levels or decks has been installed. These levels or decks 220 would rest on and connect multiple spars or flotation jackets 231 that would support said decks.

Also, penstocks 240 for aquaculture are installed below the embodiment to take advantage of nutrient rich DOW. Another advantage of DOW for aquaculture is the temperature allows for a higher level of oxygen and limits development of unwanted microorganisms. The penstocks 240 would employ netting 245 in vertical 241 and horizontal 243 locations to divide the area into pens. Shelving 261 or suspended baskets 265 would be used to support the growth of a variety of mollusks.

The first level 223 would house processing facilities for the aquaculture and any other industrial machinery or facilities such as deep ocean mining equipment. This level would also be used to install heat exchangers that would further extract moisture from the ambient air being forced through the system increasing the system's ability to produce fresh water.

The second level 225 would be a communal area; cafeteria, schools, gym, recreation, shops.

The third level 227 would be living area. Decks would be added to each level for outdoor activity or gardening.

Alternatively, the first, second, third, any combination or all of the levels could be a server farm utilizing the cool, relatively dry air to keep the machines cool and working properly. The number of levels should not be limited to three and could be as many as structural design criteria allow.

The embodiment shown in FIG. 5 also employs a means for locomotion 235, being a propeller powered by electricity. These would be located on the bottoms of each support jacket or spar 231. The DOW suction pipe 252 for this embodiment would come from the bottom of the fresh water storage tank 40 to prevent fouling the penstocks 240. The end of the suction pipe 252 would also employ a propulsion and guidance system 237 to keep the end at depth in the DOW or cold ocean water while the system 200 is being moved.

Figure 6:
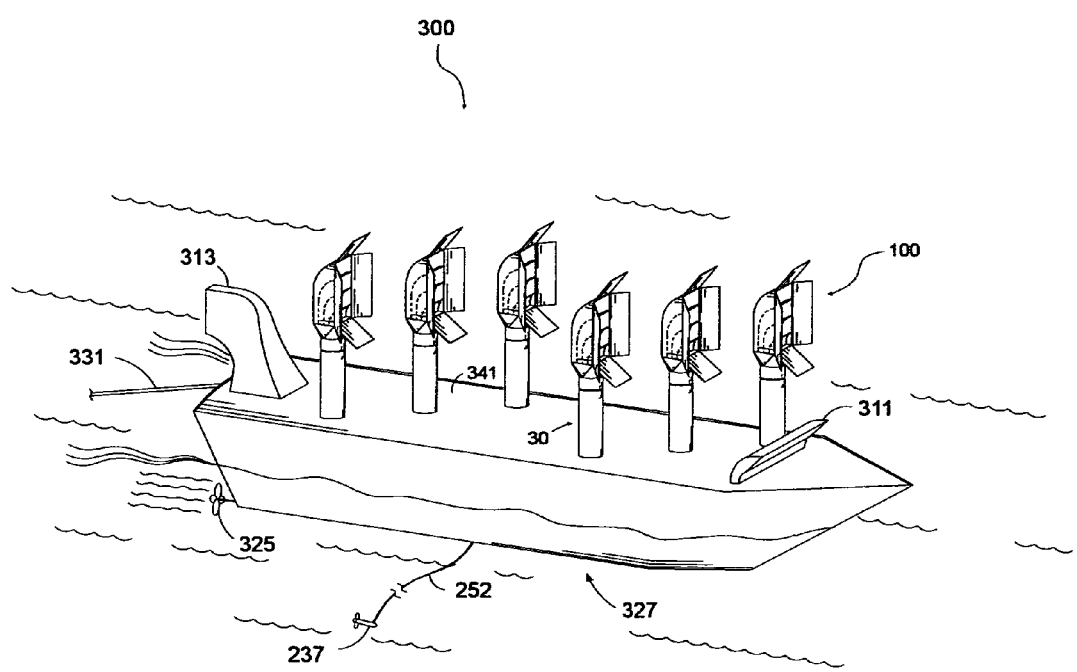
FIG. 6 shows a sea-going vessel powered by a number of systems.

A further embodiment of the system 300 is shown in FIG. 6. In this embodiment the vertical channel 30 and diverter 20 of system 100 is installed in multiple locations in an ocean-going vessel 327. The cylindrical power column 30 extends through the deck 341 and connects with a common plenum with an inlet 311 near the bow of the vessel 327 and an outlet 313 at the stern. Electrical power generated by the multiple systems 100 would power a propeller or propellers that would move the ship 327 forward.

Figure 7:
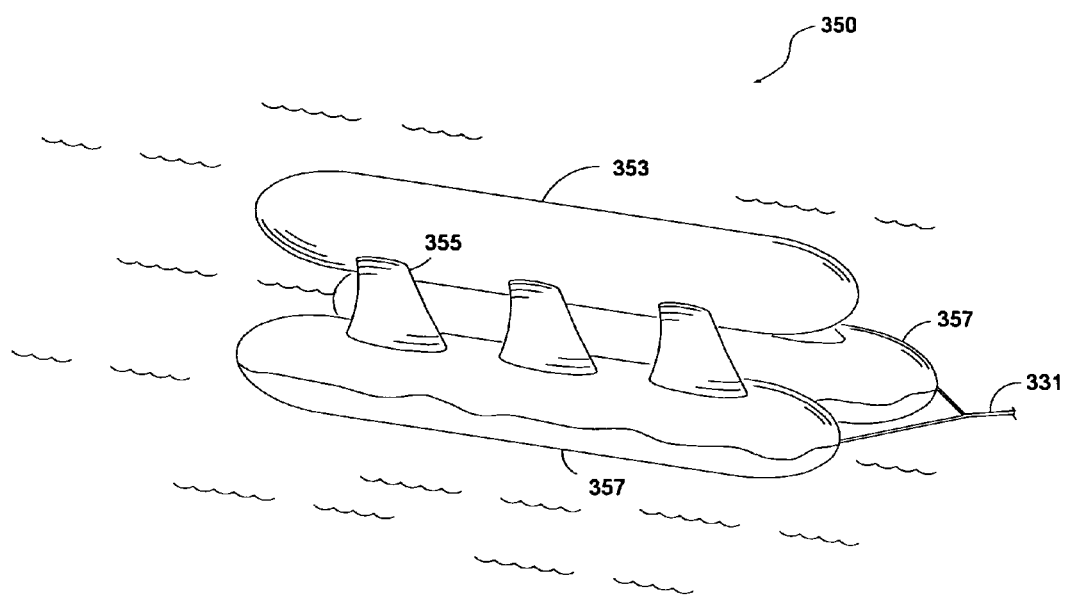
FIG. 7 shows a barge to store water and hydrogen generated by the systems of FIG. 6.

The water produced would be transported to a towed barge 350 shown in FIG. 7 via a towing cable/pipe/electrical conductor 331. This barge 350 consists of three cylindrical tanks; 353, 355, and 357. They are connected and held stable by struts 355. Water would be stored in the bottom tanks 355 and 357. Excess electrical energy would be used to perform hydrolysis on fresh water or seawater to form hydrogen to be stored in the upper tank 353. Not only can this embodiment 300 haul cargo without the expense of fuel, water and hydrogen can be sold at ports of call. Also, the hydrogen could be used to fuel an alternate propulsion system should electrical power not be available for any reason.

This type of cargo vessel 300 would be a faster method of shipping cargo without fuel costs than the proposed resurrection of sailing ships. It could also be used as emergency sources of water and electricity for coastal cities in emergency situations such as the aftermath of hurricanes or earthquakes.

Figure 8:
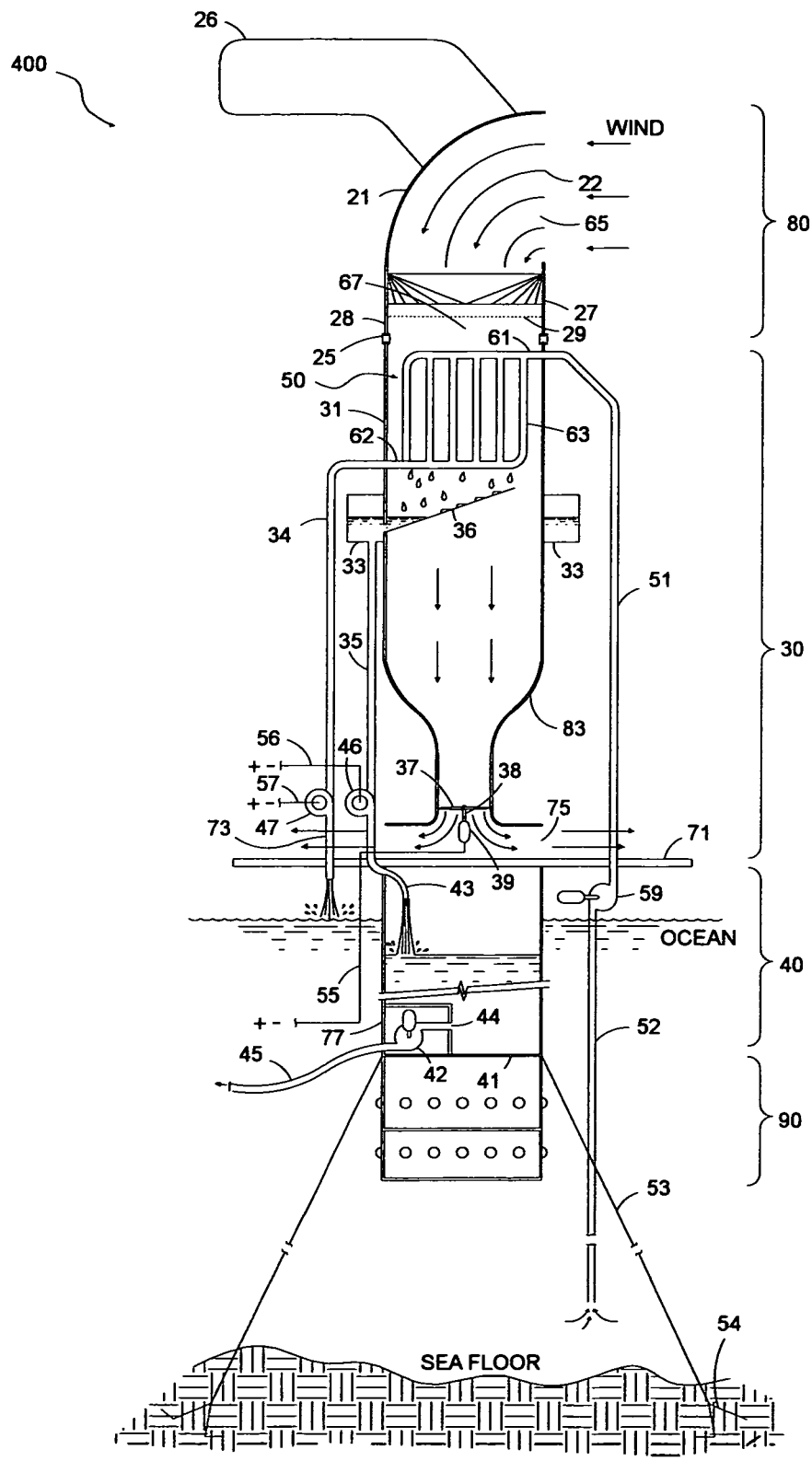
FIG. 8 shows a diagrammatic elevation of the system having a simpler wind diverter, wind concentrator, and underwater living levels.

FIG. 8 shows another embodiment 400 with a simpler wind diverter 80 and a contraction cone 83 installed in the vertical cylinder 30. The wind diverter 80 is a smaller, simpler device without doors. Ambient air is directed into the top of the cylinder 30. Before ambient air reaches the turbine blade 37 it passes through a contraction cone 83. This is similar a mechanism used in wind tunnels to concentrate air without the air becoming turbulent. This allows the turbine 37 to be smaller but operate at a higher speed. This cuts costs for the turbine blade and simplifies the gearbox portion of the gearbox/generator 39. This embodiment also shows underwater living levels 90 beneath the water storage portion of the vertical cylinder. These levels 90 are connected with the surface by stairs, ladder, or elevator and can be used for leisure as a resort destination or for scientific endeavors or a combination of the two.

I claim:

1. An apparatus for generating water and electricity using cold ocean water and ambient air, comprising:
   a vertical cylinder of sufficient area and length to induce a downward flow of said ambient air upon chilling said air with said cold ocean water;
   an conical open-ended duct, pivotal about the central vertical axis of said cylinder, having a larger horizontal inlet and a smaller vertically downward-directed outlet axially aligned with the upper, open end of said cylinder and having curved turning vanes connecting and dividing the larger inlet and smaller outlet areas into separate, respectively equal areas;
   a liquid to gas heat exchanger inside the upper end of said cylinder using cold ocean water to cool said ambient air;
   a pump for transporting said cold ocean water to said heat exchanger;
   aerodynamic troughs for collecting water condensate from the surface of said heat exchanger while offering as little resistance to the ambient air flow as possible and channeling said condensate into storage;
   a minimum two-bladed wind turbine positioned axially inside and near the bottom of said cylinder with a blade diameter smaller than the inside diameter of said cylinder;
   a transmission and generator connected to said turbine via a shaft in a manner so as not to impede the flow of air through said turbine while converting kinetic to electrical energy in the most efficient manner;
   an exhaust means comprising channels evenly spaced about the bottom of said cylinder and formed in a manner offering the least resistance for air returning to atmosphere while providing optimal geometry for integration with the structure of said cylinder with respect to structural integrity; and
   an anchoring means to stabilize said cylinder and maintain it in an upright vertical position.

2. The apparatus of claim 1, wherein said cylinder is located in close proximity to the shoreline and said means of storing said water condensate being a fresh water lake or man-made reservoir.

3. The power and water generating apparatus of claim 1 connected to duplicate apparatus wherein said electricity and said water from said apparatus for transport to land is by one pipe and one cable.

4. The apparatus of claim 1, further comprising additional heat exchangers at said exhaust means for extracting additional moisture from said ambient air.

5. An apparatus for generating water and electricity using cold ocean water and ambient air, comprising:
   a re-direction means to change flowing ambient air from a horizontal to a vertical direction comprising a 90 degree rectangular duct with turning vanes, said duct transitioning to circular at the outlet and resting on bearings allowing rotation of said duct;
   a containment means for said vertically flowing air comprising a cylindrical steel or concrete tower with an intake at the top and exhaust at the bottom of said tower;
   a means for chilling said vertically flowing air using cold ocean water, said means comprising a dimple plate or plate coil heat exchanger element arranged for minimum pressure loss;
   a means for collecting and storing water condensate from said air comprising an aerodynamic trough attached to the bottom of said heat exchanger elements in a manner to allow maximum air flow through said heat exchanger;
   a means for concentrating said air without turbulence comprising a horizontal, rectangular funnel with an apex angle of less than 45 degrees;
   a means for harvesting the kinetic energy of said air and turning it into electricity comprising a wind turbine and generator with rotational axes vertically oriented and centrally located near the bottom of said containment means; and
   a transportation means for said water condensate and electricity from said apparatus to another location comprising a pipe for said condensate and conducting cable for said electricity.

6. The apparatus of claim 5, wherein said containment means is located in close proximity to the shoreline and said means of storing said water condensate being a fresh water lake or man-made reservoir.

7. The water and electricity generating apparatus of claim 5 further comprising a means to transport electricity and water from said apparatus to a land-based distribution system.

8. The apparatus of claim 5, further comprising additional heat exchangers at said exhaust for extracting additional moisture from said ambient air.

* * * * *